United States Patent
Steffes

(10) Patent No.: US 9,527,697 B2
(45) Date of Patent: Dec. 27, 2016

(54) ARTICULATED JIB CRANE

(71) Applicant: RAKA CORPORATION, Toldeo, OH (US)

(72) Inventor: Eric Jacob Steffes, Toledo, OH (US)

(73) Assignee: RAKA CORPORATION, Toledo, OH (US)

( * ) Notice: Subject to any disclaimer, the term of this patent is extended or adjusted under 35 U.S.C. 154(b) by 164 days.

(21) Appl. No.: 14/294,260

(22) Filed: Jun. 3, 2014

(65) Prior Publication Data

US 2014/0360961 A1   Dec. 11, 2014

Related U.S. Application Data

(60) Provisional application No. 61/831,382, filed on Jun. 5, 2013.

(51) Int. Cl.
| | | |
|---|---|---|
| *B66C 23/16* | (2006.01) | |
| *B66C 1/02* | (2006.01) | |
| *F16L 27/087* | (2006.01) | |
| *B66C 23/04* | (2006.01) | |

(52) U.S. Cl.
CPC .................. *B66C 1/02* (2013.01); *B66C 23/04* (2013.01); *F16L 27/087* (2013.01)

(58) Field of Classification Search
CPC ........ B66C 23/16; B66C 23/02; B66C 23/022; B66C 23/163; B66C 13/14; F16L 27/087; F16L 27/093
USPC ......................................... 212/251, 347, 253
See application file for complete search history.

(56) References Cited

U.S. PATENT DOCUMENTS

| | | | | |
|---|---|---|---|---|
| 2,872,217 | A | * | 2/1959 | May ...................... F16L 27/093 277/362 |
| 3,137,394 | A | * | 6/1964 | Trudeau .................. C03B 9/453 414/627 |
| 4,435,118 | A | | 3/1984 | Behrend et al. |
| 4,787,813 | A | | 11/1988 | Stevens et al. |
| 4,813,845 | A | | 3/1989 | Swain |
| 4,845,603 | A | | 7/1989 | Shpigel |

(Continued)

FOREIGN PATENT DOCUMENTS

WO         8902410         3/1989

OTHER PUBLICATIONS

Free Standing Articulating Jib, Gorbel, https://gorbel.com/Products/Articulating-jib-cranes/Free-standing-articulating-jib.aspx, Jun. 11, 2013.

(Continued)

*Primary Examiner* — Emmanuel M Marcelo
*Assistant Examiner* — Justin Stefanon
(74) *Attorney, Agent, or Firm* — Fraser Clemens Martin & Miller LLC; Michael E. Dockins

(57) ABSTRACT

A fully articulated and continuous rotation jib crane system includes a first crane arm connected to a crane post by a first pivot joint and a second crane arm connected to the first crane arm by a second pivot joint, each pivot joint including a shaft having a plurality of apertures in fluid communication with the pivot joints and internal bores of the crane arms to transfer a vacuum system pressure, the pivot joints facilitating continuous rotation of each of the first and the second crane arms for any degree of rotation while maintaining the vacuum system pressure through the first and the second pivot joints and the first and the second crane arms.

10 Claims, 5 Drawing Sheets

(56) References Cited

U.S. PATENT DOCUMENTS

| | | | |
|---|---|---|---|
| 5,007,784 A * | 4/1991 | Genov | B25J 9/042 |
| | | | 198/471.1 |
| 5,025,126 A | 6/1991 | Hansen | |
| 5,160,238 A | 11/1992 | Kambara | |
| 5,221,117 A * | 6/1993 | Messinger | B66F 3/35 |
| | | | 294/183 |
| 5,741,113 A | 4/1998 | Bacchi et al. | |
| 6,366,830 B2 * | 4/2002 | Bacchi | B25J 9/042 |
| | | | 414/217 |
| 6,445,769 B1 | 9/2002 | Panasik et al. | |
| 6,485,062 B2 * | 11/2002 | Omiya | F16L 27/087 |
| | | | 285/106 |
| 7,422,412 B2 | 9/2008 | Akaha | |
| 7,946,593 B2 | 5/2011 | Alam et al. | |

OTHER PUBLICATIONS

Custom Engineered Jib Cranes, David Round, http://davidround.com/custom_jc.html, Jun. 11, 2013.

* cited by examiner

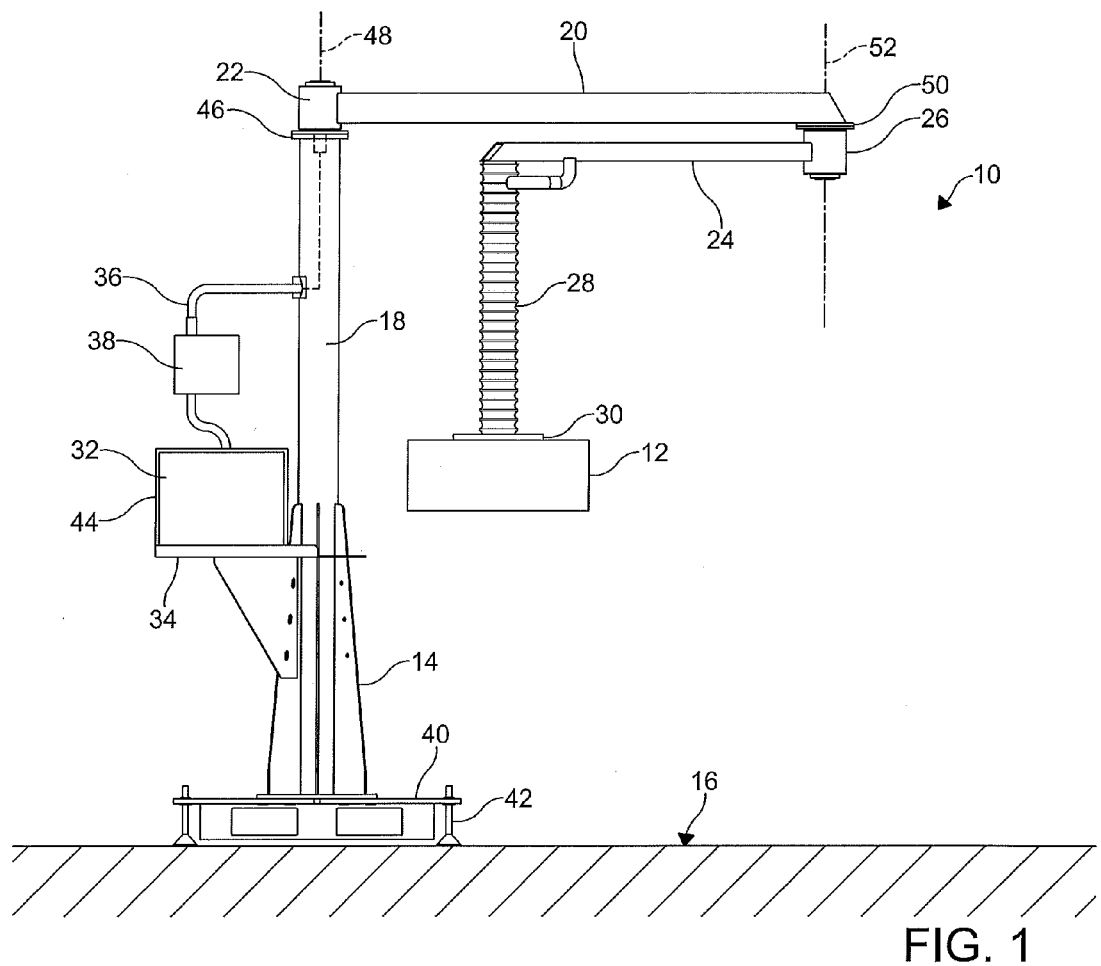
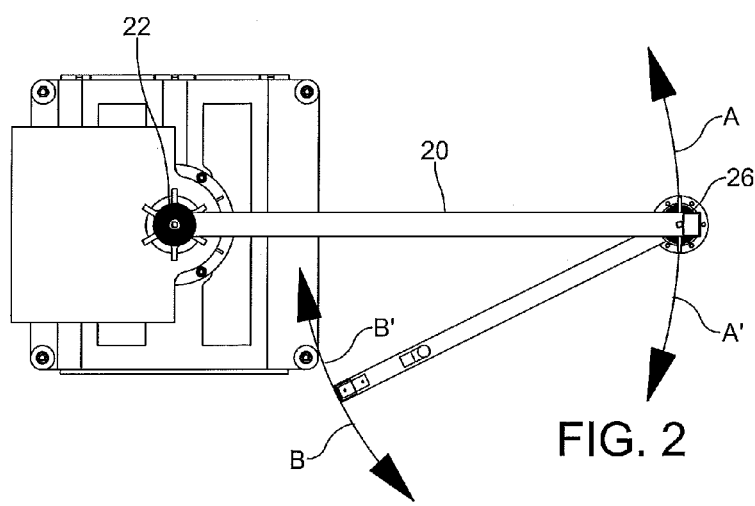
FIG. 1
FIG. 2

ARTICULATED JIB CRANE

CROSS REFERENCE TO RELATED APPLICATIONS

This application claims the benefit of U.S. Provisional Application No. 61/831,382, filed on Jun. 5, 2013. The entire disclosure of the above application is incorporated herein by reference.

FIELD OF THE INVENTION

The present invention relates to a jib crane and, more specifically, to a fully-articulated jib crane coupled with a vacuum powered lifting mechanism.

BACKGROUND OF THE INVENTION

Current jib cranes coupled with vacuum powered lifting mechanisms are not fully articulated. This is due to the vacuum tubes/conduits either being disposed on an outside of the jib crane or within the jib crane. If the jib crane were fully articulated, the vacuum tubes/conduits would become kinked, broken, or the vacuum therewithin may otherwise become cut off, thereby rendering the jib crane inoperable for its intended purpose. Furthermore, existing vacuum jib cranes require an operator thereof to be constantly aware of the position of each of a primary arm and a secondary arm thereof to ensure that the vacuum tube/conduits are not kinked, twisted, or otherwise stressed or undesirably disconnected. Accordingly, it would be desirable to develop a fully articulated jib crane capable of continuous rotation of a primary arm and a secondary arm thereof coupled with a vacuum powered lifting mechanism.

SUMMARY OF THE INVENTION

Concordant and congruous with the present invention, a fully articulated jib crane capable of continuous rotation of a primary arm and a secondary arm thereof coupled with a vacuum powered lifting mechanism has surprisingly been discovered.

In an embodiment of the invention, a connecting flange is adapted to connect to a mounting flange of a crane member. A vacuum hose connector is fixed to the connecting flange. A central shaft extending from the connecting flange has multiple apertures, with the central shaft in fluid communication with the vacuum hose connector. A pivot joint bearing housing is rotatable with respect to the connecting flange, the pivot joint bearing housing having a slot created in a wall of the pivot joint bearing housing. An arm member connected to the pivot joint bearing housing has a bore extending through the arm member in fluid communication via the slot with a vacuum pressure present at the vacuum hose connector via the apertures in the central shaft. The arm member is rotatable for any degree of rotation about a longitudinal axis of rotation of the pivot joint bearing housing without loss of the vacuum pressure in the bore of the arm member.

In a further embodiment of the invention, the jib crane includes a primary arm pivotally connected to a support and base by a primary knuckle and a secondary arm pivotally connected to the primary arm by a secondary knuckle, each knuckle including a tapered roller bearing, a seal, and a perforated bearing shaft facilitating a flow of fluid through the arms of the jib crane to a tube lifter.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a front elevational view of a jib crane according to an embodiment of the present invention;

FIG. 2 is a top plan view of the jib crane of FIG. 1 having the vacuum lift device and the vacuum lifted product of FIG. 1 removed for clarity;

DETAILED DESCRIPTION OF EXEMPLARY EMBODIMENTS OF THE INVENTION

Figure 3:
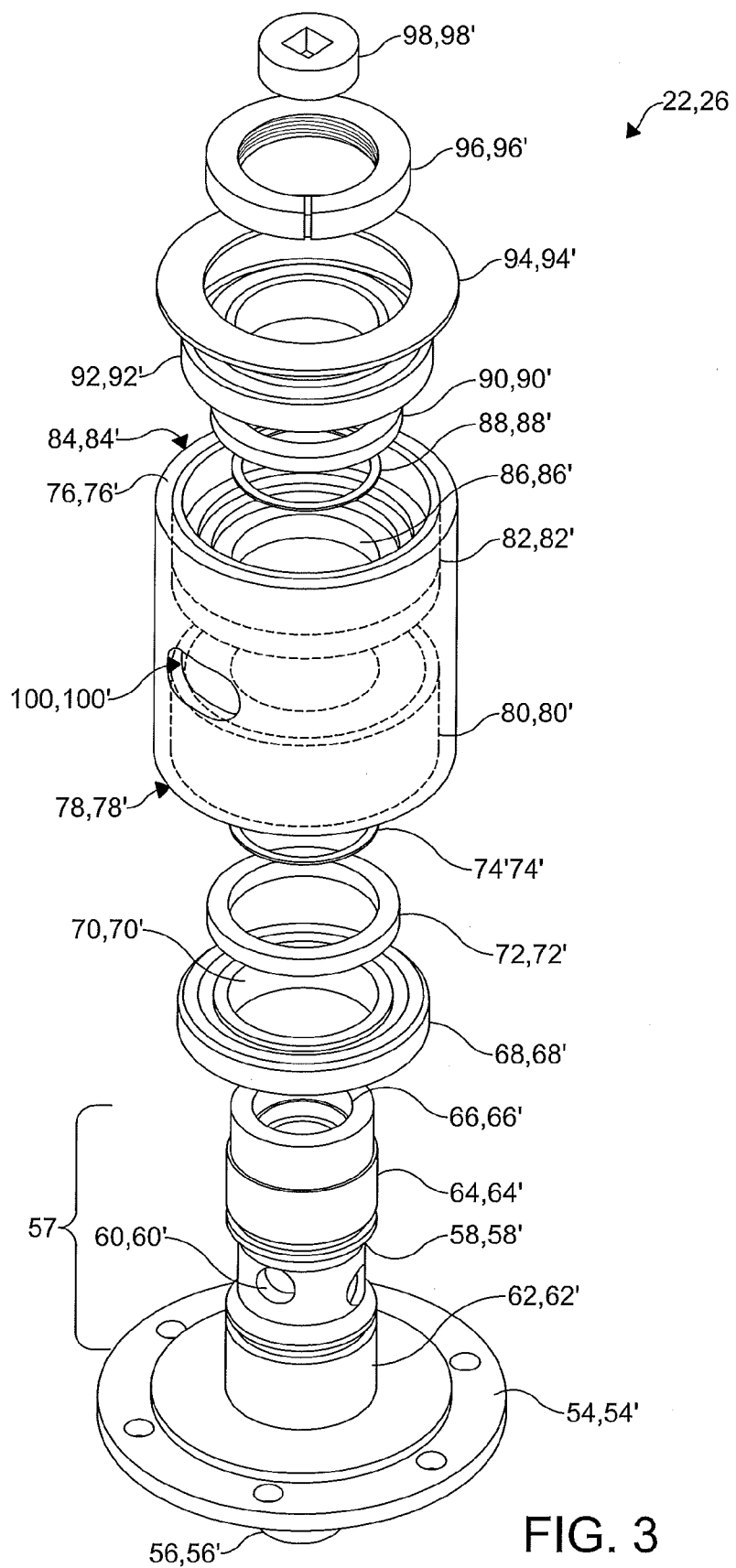
FIG. 3 is an exploded view of one of the pivot joints of the jib crane of FIGS. 1 and 2.
Figure 4:
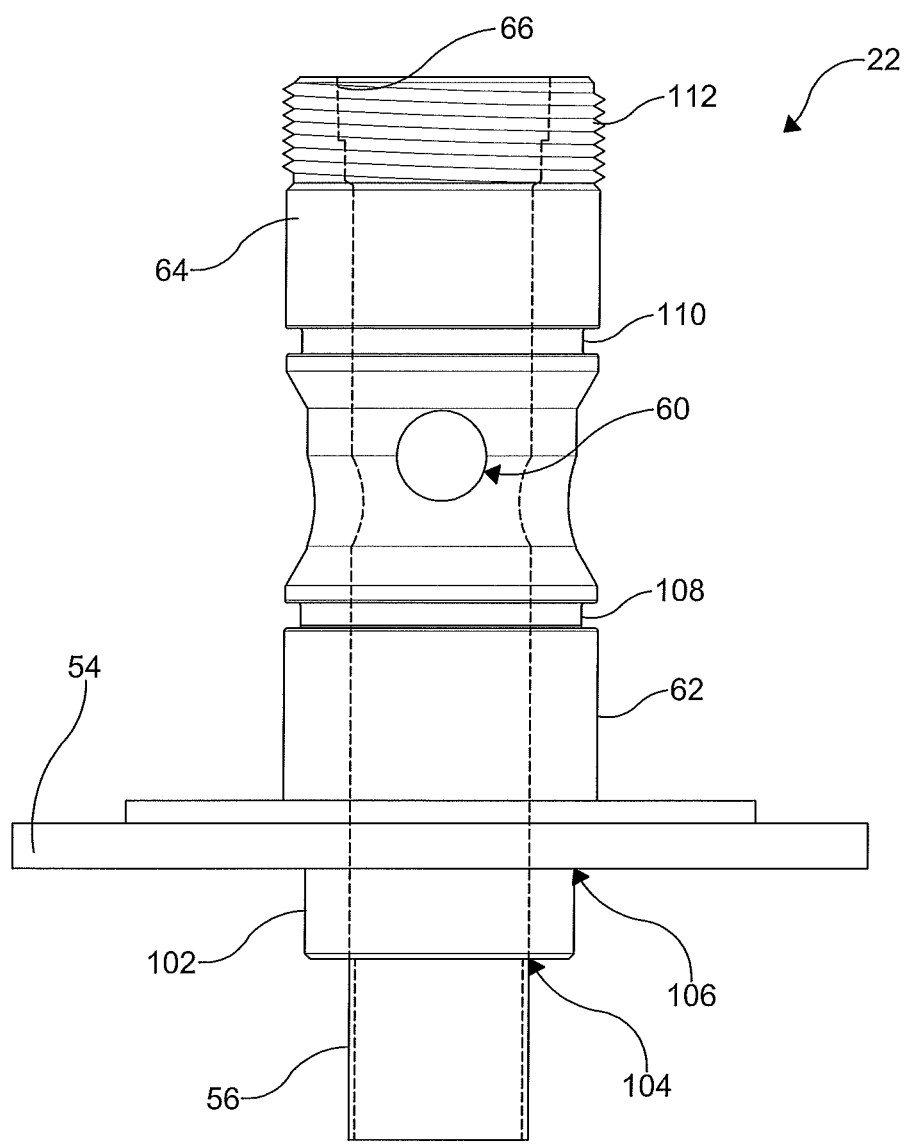
FIG. 4 is a side elevational view of the bearing and flange portions of the pivot joint of FIG. 3.
Figure 5:
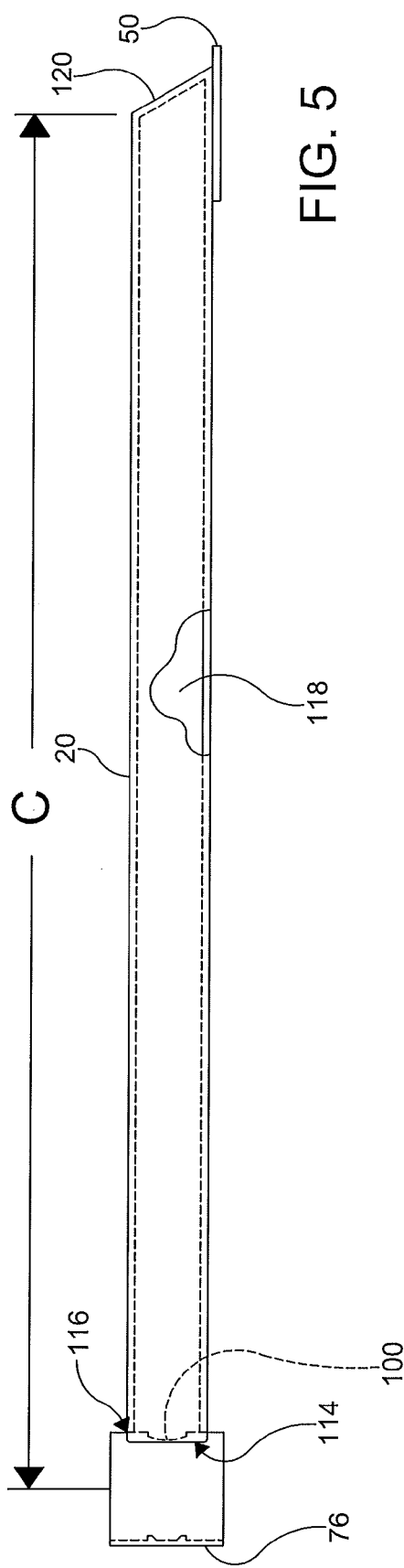
FIG. 5 is a side elevational view of a primary arm of the jib crane of FIG. 1.
Figure 6:
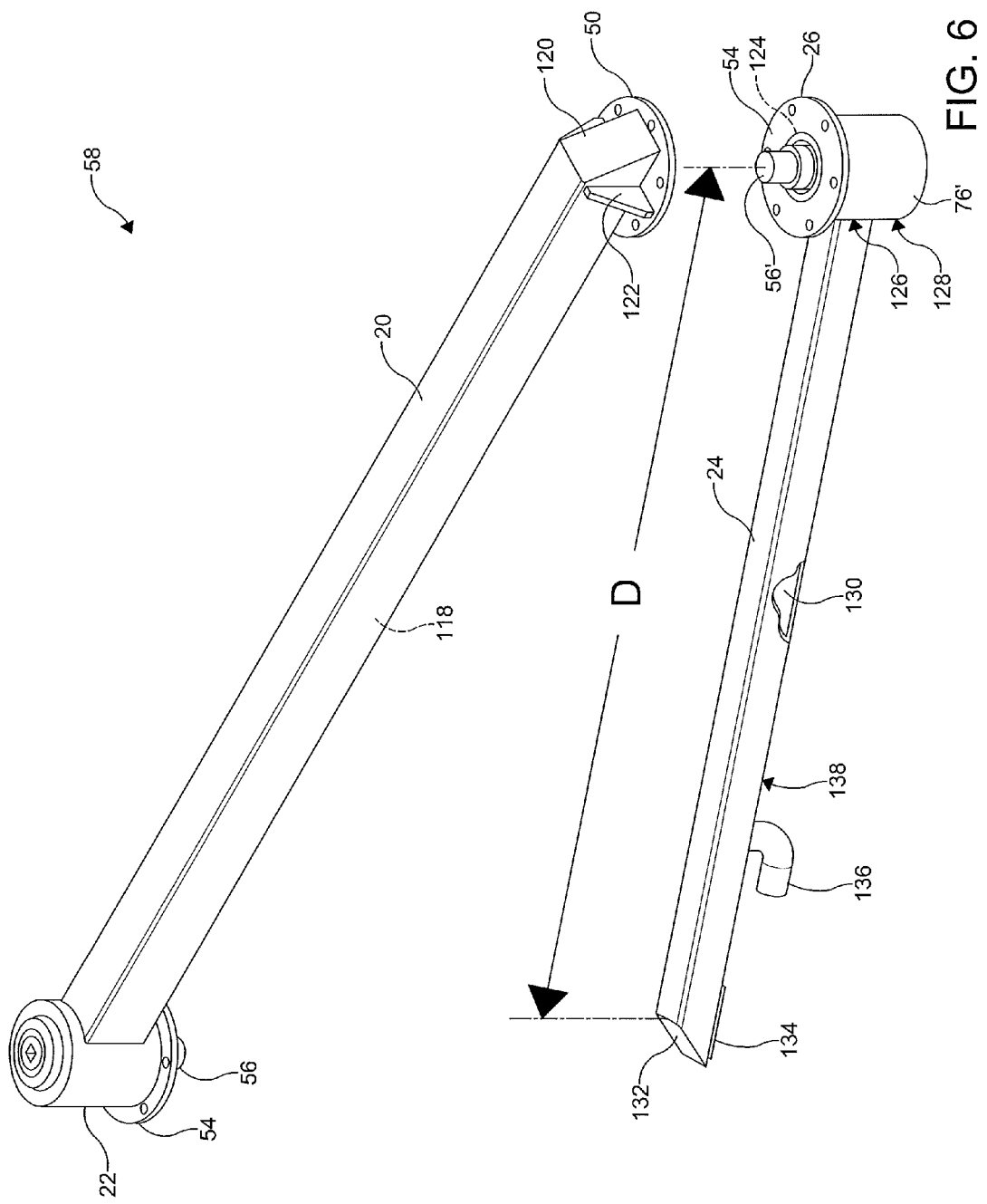
FIG. 6 is an exploded top perspective view of a primary arm and a secondary arm of the jib crane of FIGS. 1 and 2.

The following detailed description and appended drawings describe and illustrate various exemplary embodiments of the invention. The description and drawings serve to enable one skilled in the art to make and use the invention, and are not intended to limit the scope of the invention in any manner.

FIGS. 1-6 show a fully articulated jib crane system 10 in accordance with the invention. The present jib crane is defined as "fully articulated" in that it can function with 360° or greater continuous rotation of one or both of two crane arms individually rotatably connected by one of a first or a second pivot joint. Each pivot joint is equipped with tapered roller bearings, pre-greased and sealed-designed to a 5:1 safety factor or to another safety factor, as desired. Known jib cranes are not "fully articulated" because they do not permit 360° or greater continuous rotation due to required external wiring, vacuum hoses, plumbing, or the like which are positioned along and generally outside of the joints connecting the jib crane arms, which bind and therefore prevent continuous rotation.

Referring specifically to FIG. 1, a fully articulated jib crane system 10 of the present disclosure applies vacuum system pressure to remotely lift and move items such as a product 12. The jib crane system 10 includes a crane pedestal 14 which can be either fixedly or releasably connected to a planar surface 16 such as the floor of a building. The planar surface 16 is a representative surface for attachment of the jib crane system 10, and can also be a building ceiling, a building support column, a portable machine, or the like. A crane post 18 made for example from tubular steel is fixed to the crane pedestal 14 and according to several aspects is oriented vertically upright and perpendicular with respect to the planar surface 16. It is understood that the crane post 18 may have an angled orientation with respect to the planar surface 16, as desired. To provide for remote positioning of the product 12, a first crane arm 20 is rotatably connected to a free end of the crane post 18 using a first pivot joint 22, which will be described in greater detail in reference to FIG. 3. The first crane arm 20 is therefore oriented substantially parallel to planar surface 16 to maximize a reach of the first crane arm 20. The first crane arm 20 can also be rotatably connected at a free end to a second crane arm 24 using a second pivot joint 26, which is similar or identical in design and function to the first pivot joint 22.

A flexible connector 28 such as a vacuum tube-lifter is connected to a free end of the second crane arm 24 to downwardly extend vacuum service between the distal end of the second crane arm 24 to a vacuum lift device 30 such as an end effector. The vacuum lift device 30 directly contacts and applies vacuum pressure to temporarily retain the product 12 in contact with the vacuum lift device 30. The flexible connector 28 can also allow for upward and downward displacement of the vacuum lift device 30. During a lift and transfer operation of the product 12, the vacuum lift device 30 together with the product 12 are manually displaced, therefore motors, pumps, mechanical operators and the like to assist in displacement of the vacuum lift device 30 are not required for the jib crane system 10. Vacuum pressure for the jib crane system 10 is generated and maintained at the vacuum lift device 30 using a vacuum generation device 32. To preclude the need for wires extending through the first and the second crane arms 20, 24, the operator of the jib crane system 10 can communicate using a wireless communication system or device in communication with the generation device 32 while located at the vacuum lift device 30.

According to several embodiments, the vacuum generation device 32 is connected to and supported from the crane pedestal 14 using a pedestal support member 34 to minimize an amount and a length of connectors and vacuum tubing, such as vacuum tubing 36, connected to the crane post 18. The vacuum generation device 32 can also be remotely positioned with respect to the crane pedestal 14. To maintain the cleanliness of the vacuum portions and tubing of the jib crane system 10, an inline vacuum filter 38 is connected to the vacuum tubing 36 with the vacuum tubing 36 also connected to vacuum generation device 32. Because the crane post 18 does not rotate, the vacuum tubing 36 downstream of the vacuum filter 38 enters the crane post 18 and extends through an inner bore of the crane post 18 and is connected to a vacuum hose connector 56 (see FIGS. 3 and 4) of the first pivot joint 22. The inner bore of the crane post 18 can therefore be at atmospheric pressure and is not exposed to vacuum system pressure.

As a further mounting method, the crane pedestal 14 of the jib crane system 10 can be fixedly connected to a portable-base 40, which by the use of multiple height adjustment members 42 can be horizontally leveled even if the planar surface 16 is not horizontally level. Counterweights (not shown) can also be added to the portable-base 40 to balance the first and second crane arms 20, 24 when the product 12 is lifted. Components of the vacuum generation device 32 can be enclosed in a sound deadening enclosure 44, as desired.

An upper end of the crane post 18 includes a first mounting flange 46 which has the first pivot joint 22 connected thereto. The first pivot joint 22 and the first crane arm 20 rotate with respect to a first axis of rotation 48, which also defines a central longitudinal axis of the first crane arm 20. The first pivot joint 22 is free to rotate for any degree of rotation (including less than, equal to, or greater than 360 degrees of rotation) with respect to the first axis of rotation 48, without hindering vacuum system lines, hoses, or connectors. An end of the first crane arm 20 includes a second mounting flange 50 which has the second pivot joint 26 connected thereto. The second pivot joint 26 and the second crane arm 24 rotate with respect to a second axis of rotation 52, which also defines a central longitudinal axis of the second mounting flange 50. The second pivot joint 26 is also free to rotate for any degree of rotation (including less than, equal to, or greater than 360 degrees of rotation) with respect to the second axis of rotation 52, without limitation of vacuum system lines, hoses, or connectors. The vacuum lift device 30 can therefore be positioned at any location from adjacent to the crane post 18 out to a fully extended orientation having first and the second crane arms 20, 24 in axial alignment with each other and rotated to any rotated position via the first and/or the second axes of rotation 48, 52.

Referring specifically to FIG. 2 and again to FIG. 1, the first crane arm 20 is continuously rotatable with respect to the longitudinal axis 48 of the first pivot joint 22 in either a first rotational direction A or an opposite second rotational direction A' for up to and greater than 360 degrees of rotation. The second crane arm 24 is also continuously rotatable with respect to the longitudinal axis 52 of the second pivot joint 26 in either a first rotational direction B or an opposite second rotational direction B' for up to and greater than 360 degrees of rotation.

Referring to FIG. 3 and again to FIGS. 1-2, each of the first and the second pivot joints 22, 26, also referred to as knuckles or knuckle joints, can be identical or can be of different sizes, and the part numbers having a prime symbol (') are used to indicate the same part used on different ones of the first or the second pivot joints 22, 26. The following discussion providing a part number for each component also applies to components having a prime symbol ('). Each of the first and the second pivot joints 22, 26 may include a connecting flange 54 which is releasably fastened to either the first mounting flange 46 of the crane post 18 or the second mounting flange 50 of the first crane arm 20. The vacuum hose connector 56 is connected using air-tight joints such as welded joints, for example, to the connecting flange 54. The vacuum hose connector 56 is connected to a vacuum hose or pipe such as the vacuum tube 36, which is extended at least partially through a hollow bore of the crane post 18. A shaft 57 includes a central shaft portion 58 extending away from the connecting flange 54 having multiple apertures 60 to provide fluid communication from the vacuum hose connector to the internal passages of the first and the second pivot joints 22, 26. The quantity and size of the apertures 60 equals or exceeds the area of vacuum tube 36. The central shaft portion 58 is integrally connected to a lower shaft portion 62 of shaft 57 which is directly connected to the connecting flange 54. A bearing shaft portion 64 of shaft 57 extends upwardly away from the central shaft portion 58. A first roller bearing 68 is received with an inner bearing sleeve 70 contacting the lower shaft portion 62. A first radial shaft lip seal 72 initially slides onto and then creates a rotary seal against the lower shaft portion 62 and is positioned below the multiple apertures 60. Contact by the first radial shaft lip seal 72 retains the lubricant of the first roller bearing 68 and retains vacuum seal against the lower shaft portion 62. A first O-ring seal 74 is positioned about an O-ring slot (described in reference to FIG. 4) of the lower shaft portion 62 to seal a portion of the lower shaft portion 62 exposed to atmosphere from the apertures 60.

A pivot joint bearing housing 76 is then slidably disposed onto the bearing shaft portion 64 until a housing first end 78 having a first insert 80 engages the first roller bearing 68. The first radial shaft lip seal 72 is pressed into and therefore retained by the first insert 80. A similar second insert 82 is positioned proximate to a housing second end 84 with a shaft receiving bore 86 rotatably receiving the bearing shaft 64. In reverse order, a second O-ring seal 88 is positioned about an O-ring slot (described in reference to FIG. 4) of the bearing shaft portion 64, a second radial shaft lip seal 90 initially slides onto and thereafter creates a rotary seal against the upper bearing shaft portion 64 and is positioned above the multiple apertures 60, and a second roller bearing 92 is disposed on the bearing shaft portion 64 and in contact with the second insert 82. The second radial shaft lip seal 90 is pressed into and therefore retained by the second insert 82. A dust cap 94 is fastened to the housing second end 84 and a bearing lock nut 96 is fastened to contract into contact with the perimeter of the bearing shaft portion 64 to retain the above components of the first and second pivot joints. An NPT pipe plug 98 is then installed in the central bore 66 proximate to the bearing shaft portion 64 to provide a vacuum pressure boundary at the free end of the bearing shaft portion 64. With the above components thus in place, vacuum pressure provided at the vacuum hose connector 56 is in fluid communication with the apertures 60 via the central bore 66, and through an elongated slot or aperture 100, or other aperture created in the pivot joint bearing housing 76, but is isolated from the atmosphere at the end of the central bore 66 by the NPT pipe plug 98.

Referring to FIG. 4 and again to FIGS. 1-3, the vacuum hose connector 56 is connected to a tubular portion 102 extending from lower shaft portion 62 through the connecting flange 54 using a vacuum tight connection 104 such as a weld joint. The tubular portion 102 is connected to the connecting flange 54 using a vacuum tight connection 106 such as a weld joint. A first seal groove 108 is located between the apertures 60 and the connecting flange 54. The first O-ring seal 74 is received in the first seal groove 108. A second seal groove 110 is located between the apertures 60 and the bearing shaft portion 64. The second O-ring seal 88 is received in the second seal groove 110. A threaded portion 112 extends away from the bearing shaft portion 64 and is threadedly engaged by corresponding threads of the bearing lock nut 96.

Referring to FIG. 5 and again to FIGS. 1-4, the first crane arm 20 is constructed with an end 114 of the first crane arm 20 shaped to correspond to the radius of curvature of an outer perimeter surface 116 of the pivot joint bearing housing 76 and the end 114 is fixed such as by welding to the pivot joint bearing housing 76. The elongated slot 100 created in the pivot joint bearing housing 76 provides fluid communication with an inner bore 118 of the first crane arm 20, thereby communicating the vacuum pressure at the apertures 60 of central shaft portion 58 of the first pivot joint 22 with the inner bore 118. An end portion 120 seals the free end of the first crane arm 20 such that vacuum system pressure in the inner bore 118 is communicated to the vacuum hose connector 56' (shown in FIG. 6) of the second pivot joint 26 which is connected to the second mounting flange 50. It is noted the second pivot joint 26 can be reverse oriented or upside-down compared to the orientation of the first pivot joint 22, as desired.

Referring to FIG. 6 and again to FIGS. 1-5, one or more gussets 122 can be fixed to the first crane arm 20 at the connection with the second mounting flange 50, to prevent torsional or bending motion of the second mounting flange 50 when the second crane arm 24 rotates. The vacuum hose connector 56' of the second pivot joint 26 extends through the second mounting flange 50 such that vacuum system pressure in the inner bore 118 is communicated through the vacuum hose connector 56' to the second pivot joint 26. The connecting flange 54' of the second pivot joint 26 is coupled to the second mounting flange 50 with a sealing gasket 124 positioned therebetween. Similar to first crane arm 20, the second crane arm 24 is constructed with an end 126 of the second crane arm 24 shaped to correspond to the radius of curvature of the pivot joint bearing housing 76' and the end 126 is fixed such as by welding to the pivot joint bearing housing 76'. The elongated slot 100' of the pivot joint bearing housing 76' provides fluid communication with an inner bore 130 of the second crane arm 24, thereby communicating the vacuum pressure at the apertures 60' of the central shaft portion 58' of the second pivot joint 26 with the inner bore 130. An end portion 132 seals the free end of the second crane arm 24 such that vacuum system pressure in the inner bore 130 is communicated to an elbow assembly 136 sealingly connected through a lower face 138 of the second crane arm 24. With reference again to FIG. 1, the flexible connector 28 is connected to the elbow assembly 136 to communicate vacuum system pressure from inner bore 130 via elbow assembly 136, through flexible connector 28 to the vacuum lift device 30.

Vacuum system pressure is therefore communicated from the crane pedestal 14 to the free end of the second crane arm 24 and via the elbow assembly 136, through the flexible connector 28 to the vacuum lift device 30. The first and the second crane arms 20, 24 and the bearing housings 76, 76' of the first and the second pivot joints 22, 26 are welded air tight and make up the vacuum chambers themselves. The first and the second pivot joints 22, 26 are outfitted with radial shaft seals and O-rings seals 74, 88 to thereby perform as vacuum rotary unions. The bearing shaft 64 of each of the first and the second pivot joints 22, 26 is hollow with cross-drilled holes 60, 60' through the shaft's wall thereby directing the airflow. Embodiments of the invention anticipate that an equivalent cross-sectional area of about a 1 inch or about a 2 inch diameter flow path is maintained throughout the crane arms; from the crane pedestal 14 inlet at the vacuum tubing 36, to the end of the second crane arm 24 at the elbow assembly 136. Other equivalent cross-sectional areas may be used depending on the use of the system 10.

The design of the jib crane system 10 inherently eliminates the need for vacuum hoses to be externally or internally plumbed from a first knuckle or first pivot joint 22 at the crane pedestal 14 to the end of the second crane arm 24 of the articulated jib crane system 10. Inner bores of the first and the second crane arms 20, 24 replace existing vacuum hoses and the inherent limitations for rotation of the first and the second crane arms 20, 24 that would occur using vacuum hoses. The use of the first and the second rotary bearings 68, 68' and 92, 92' in the first and the second rotary joints 22, 26 of the present disclosure provides the material handling industry with a uniquely compact and fully articulated jib crane.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. Where duplicate components are referred to herein, the same part used on a second or later component may have a prime symbol (').

From the foregoing description, one ordinarily skilled in the art can easily ascertain the essential characteristics of this invention and, without departing from the spirit and scope thereof, can make various changes and modifications to the invention to adapt it to various usages and conditions.

I claim:

1. A jib crane system, comprising:
a first pivot joint rotatable with respect to a planar surface and with respect to a longitudinal axis of the first pivot joint which is perpendicularly aligned with respect to the planar surface;
a first crane arm connected to the first pivot joint and thereby rotatable with respect to the planar surface, with a first bore of the first crane arm in fluid communication with the first pivot joint, the first crane arm continuously rotatable about the longitudinal axis of the first pivot joint with respect to the planar surface and with a vacuum pressure present in the first pivot joint and in communication with the first bore of the first crane arm; and
a second pivot joint having a second pivot joint bearing housing fixed to an end of the first crane arm, wherein each of the first and second pivot joints includes a tapered roller bearing, an O-ring seal, and a central shaft portion having multiple apertures facilitating a flow of fluid through the first and second crane arms.

2. The jib crane system of claim 1, further comprising:
a crane post connected to the planar surface having the first pivot joint connected to the crane post; and
a vacuum pressure device having a vacuum tube extending from the vacuum pressure device and providing fluid communication with the first pivot joint.

3. The jib crane system of claim 1, wherein the first crane arm is fixed to a pivot joint bearing housing of the first pivot joint, with a slot created in the pivot joint bearing housing to provide fluid communication between the first pivot joint and the first bore of the first crane arm.

4. The jib crane system of claim 1, further comprising a second crane arm pivotally connected to the second pivot joint using at least one roller bearing positioned within the second pivot joint bearing housing of the second pivot joint, wherein the second crane arm is continuously rotatable about a longitudinal axis of the second pivot joint with the vacuum pressure present in the first pivot joint, the first bore of the first crane arm, the second pivot joint, and throughout a second bore of the second crane arm.

5. The jib crane system of claim 1, wherein the multiple apertures are created along the central shaft portion.

6. The jib crane system of claim 5, wherein the multiple apertures are radially disposed on the central shaft portion.

7. A fully articulated jib crane system, comprising:
a support;
a first arm pivotally connected to the support;
a second arm pivotally connected to the first arm;
a first pivot joint pivotally connecting the support and the first arm; and
a second pivot joint pivotally connecting the first arm to the second arm;
wherein the first arm is continuously pivotal about a longitudinal axis of the first pivot joint and the second arm is continuously pivotal about a longitudinal axis of the second pivot joint with a vacuum pressure present in the first and second pivot joints and in communication with a first bore of the first arm and a second bore of the second arm, wherein each of the first and second pivot joints includes a tapered roller bearing, a seal positioned to create a vacuum pressure seal between the tapered roller bearing and atmosphere, and a shaft extending through a race of the tapered roller bearing, the shaft having multiple apertures facilitating vacuum pressure communication to individual ones of the first and second arms.

8. The fully articulated jib crane system of claim 7, further comprising:
a flexible connector connected to a free end of the second arm; and
a vacuum lift device connected to the flexible connector such that the vacuum pressure is communicated to the vacuum lift device from the second arm via the vacuum lift device.

9. The fully articulated jib crane system of claim 7, wherein the multiple apertures are created along the shaft.

10. The fully articulated jib crane system of claim 9, wherein the multiple apertures are radially disposed on the shaft.

* * * * *